(No Model.)
W. S. REEDER.
KING BOLT SOCKET.
No. 410,853. Patented Sept. 10, 1889.
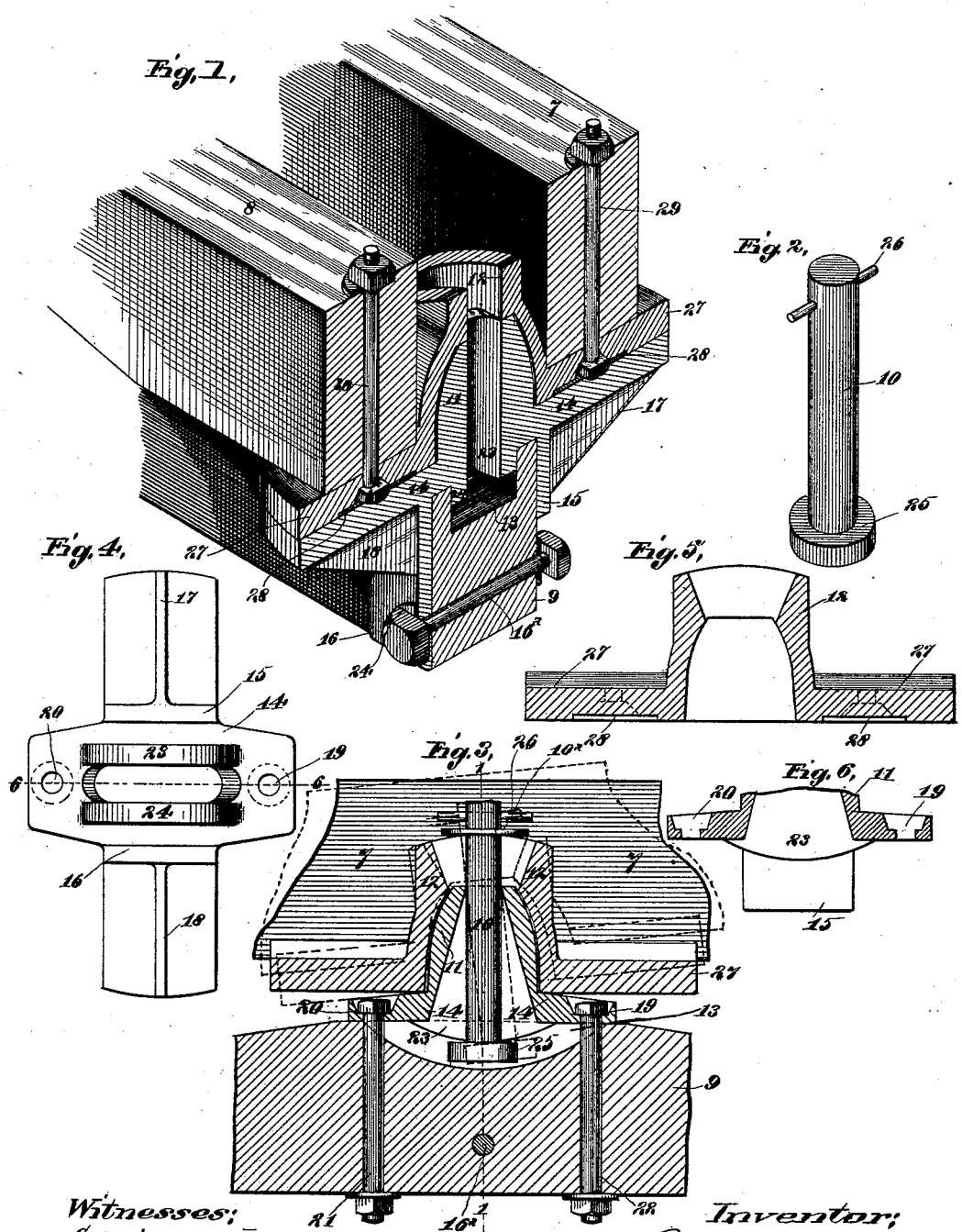
Witnesses:
G. M. Hinchman Jr.
Charles Pickles.
Inventor:
Wm. S. Reeder,
By Fowler & Fowler
Attorneys.

UNITED STATES PATENT OFFICE.

WILLIAM S. REEDER, OF ST. LOUIS, MISSOURI, ASSIGNOR TO THE KINGSLAND & DOUGLAS MANUFACTURING COMPANY, OF SAME PLACE.

KING-BOLT SOCKET.

SPECIFICATION forming part of Letters Patent No. 410,853, dated September 10, 1889.

Application filed June 21, 1889. Serial No. 315,092. (No model.)

*To all whom it may concern:*

Be it known that I, WILLIAM S. REEDER, a citizen of the United States, residing at St. Louis, in the State of Missouri, have invented certain new and useful Improvements in King-Bolt Sockets, of which the following is such a full, clear, and exact description as will enable any one skilled in the art to which it appertains to make and use the same, reference being had to the accompanying drawings, forming part of this specification.

The object of my invention is to provide means for re-enforcing the king-bolt in wagons and other conveyances, especially of heavy draft, and also to construct a king-bolt so as to permit a certain play of the front axle and body of the vehicle in order to subject the king-bolt and socket to as little strain as possible.

The invention consists of certain details of construction and arrangement, which will be herein described in full, and then particularly pointed out in the claim making a part hereof.

In conveyances that are designed for heavy draft when one of the fore wheels on either side encounters a rut or mud-hole that end of the axle is immediately depressed and the whole weight of the vehicle is thrown upon the king-bolt, and it is thereby often broken. The present invention is especially designed to overcome this objection, and it does it in two ways—first, by re-enforcing the king-bolt, and, second, by permitting the front axle and body of the vehicle to have a certain play, and thereby lessening the strain put upon the parts.

In the accompanying drawings, Figure 1 is an isometric projection of an apparatus embodying one form of my invention, sectioned on the line 1 1 of Fig. 3. Fig. 2 is an isometric projection of a detail. Fig. 3 is a vertical section of the invention through the middle of the axle. Fig. 4 is a bottom plan of a detail. Fig. 5 is a vertical section of a detail. Fig. 6 is a section on the line 6 6 of Fig. 4.

The same figures of reference indicate the same parts throughout the several views.

7 and 8 are timbers that run parallel with the axle and support the body of the vehicle, and 9 is the axle thereof, which is sustained by the wheels at each end. 10 is the king-bolt which joins the aforementioned parts together. Ordinarily the king-bolt passes through the timber upon which the body of the wagon rests, and also through the axle, and is the only means by which the parts are joined together. In my invention I extend the socket of the king-bolt in the axle upward to form a ball-shaped or conical part 11, over which fits a ball-shaped or conical socket 12, secured to the timber or timbers to which the body of the vehicle is attached. The king-bolt in the present instance does not pass through the axle or timbers that support the body of the vehicle, but only through the ball-and-socket joint. The upper part of the axle is cut away at the point 13, in order to accommodate the lower end of the king-bolt.

The aforesaid parts are attached to the timbers and axle in a peculiar manner, and are also of novel construction, and will now be set forth in detail.

The ball-joint 11 is formed upon a plate 14, and has a hole through it for the reception of the king-bolt. This hole is elongated or made conical in the direction of the axle, (see Fig. 3,) in order that the king-bolt may play in the direction of the axle. The plate 14 has four wings, from the under side of which project clips 15 and 16, that embrace the axle, and are secured to the same by a bolt 16ª passing therethrough. Between two of the wings of the plate 14 and the clips 15 and 16 extend brace-plates 17 and 18 for stiffening the same. The other two wings of the plate 14 are provided with perforations 19 and 20, through which bolts 21 and 22 pass and secure said plate and ball-joint to the axle 9. The bottom of the plate 14, adjacent to the king-bolt socket, has downward extensions 23 and 24, that are curved from the top of the ball-joint, about which the king-bolt swings as a pivot. Said king-bolt has a head 25, which rides along said curved extensions when the king-bolt plays in one or the other direction in the line of the axle. The top of the ball-socket 12 is also curved, and over the same rides a pin 26, which is driven through the other end of the king-bolt and holds it in place.

10ª is a washer, which is placed between the pin 26 and the top of the socket-piece 12 to keep the parts from becoming unshipped. The ball-socket 12 is perforated at the top for the king-bolt to pass through, and is cut away in the direction of the axle to give the upper end of the king-bolt play in that direction the same as the lower end of said king-bolt has in the ball-joint 11. The ball-socket 12 has four wings or plates 27 extending therefrom, corresponding to the four wings of the plate 14, with which the ball-socket 12 is integral. Two of said plates 27 are provided with screw-holes 28, through which bolts 29 and 30 pass and join said ball-socket to the timbers 7 and 8.

It will be noted that the ball-joint 11 re-enforces the king-bolt, and when any strain is thrown upon the parts it is taken up by the ball-and-socket joint and the king-bolt together, instead of the king-bolt alone, as in previous constructions, so that should one of the wheels of the vehicle encounter a rut or depression in the roadway the king-bolt will be materially re-enforced and breaking of the same will be prevented.

To permit the axle and body of the vehicle to have the requisite play when inequalities in the road are encountered and obviate undue strain being thrown upon the parts under such circumstances, I construct said parts so as to leave a slight play between the ball and socket, and I also fashion the plates 27 and 14 so that a slight play will be permitted between them. In Fig. 3 is shown in dotted lines the position the parts will assume when one of the hind wheels, for instance, encounters a depression in the roadway and tilts the body of the vehicle, and is illustrated the play that the parts are capable of under the construction set forth. Should one of the fore wheels of the vehicle encounter a depression in the roadway, the ball-joint 11 and the axle shown in this figure would be tilted, instead of the ball-socket 12 and body of the vehicle, as in the previous instance.

I am aware that other means have been devised for re-enforcing the king-bolts of vehicles; but my means of doing the same is different from such previous devices, in that my construction permits more freedom of action of the parts and enables the king-bolt to have greater play.

What I desire to claim as new and secure by Letters Patent of the United States as my invention is—

As a means for re-enforcing the king-bolt of a vehicle to prevent breakage of the same, a ball-joint 11, formed upon a plate 14, secured to the axle and surrounding the king-bolt, and having a hole in its apex which fits the king-bolt snugly, about which hole the king-bolt swings as a center, the interior of the said ball-joint being cut away taperingly from the apex to the plate 14 in the direction of the length of the axle, the curved downward extensions 23 upon the plate 14, over which the head of the king-bolt rides, and the ball-socket 12, formed upon the plates 27 and embracing said ball-joint and secured to the timbers 7 and 8, that support the vehicle, the said ball-socket 12 being cut away taperingly from the apex of the ball-joint 11 to its own top in the direction of the length of the axle, and having a curved top over which the pin 26, which secures the king-bolt in place, may ride, the said plates 14 and 27 being constructed to permit play between them, substantially as and for the purpose set forth.

In testimony whereof I have hereunto set my hand and affixed my seal, this 3d day of June, 1889, in the presence of the two subscribing witnesses.

WILLIAM S. REEDER. [L. S.]

Witnesses:
  A. C. FOWLER,
  M. S. REEDER.